(12) United States Patent
Watanabe et al.

(10) Patent No.: US 12,383,989 B2
(45) Date of Patent: Aug. 12, 2025

(54) TIG WELDING FILLER METAL AND METHOD FOR PRODUCING WELD JOINT USING THE SAME

(71) Applicant: JFE Steel Corporation, Tokyo (JP)

(72) Inventors: Kazufumi Watanabe, Tokyo (JP); Atsushi Takada, Tokyo (JP); Akiyoshi Ando, Tokyo (JP); Takatoshi Okabe, Tokyo (JP); Keiji Ueda, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 0 days.

(21) Appl. No.: 18/265,497

(22) PCT Filed: Dec. 16, 2021

(86) PCT No.: PCT/JP2021/046538
§ 371 (c)(1),
(2) Date: Jun. 6, 2023

(87) PCT Pub. No.: WO2022/131333
PCT Pub. Date: Jun. 23, 2022

(65) Prior Publication Data
US 2024/0075560 A1 Mar. 7, 2024

(30) Foreign Application Priority Data
Dec. 17, 2020 (JP) .................................. 2020-209326

(51) Int. Cl.
B23K 35/30 (2006.01)
B23K 35/22 (2006.01)
B23K 103/04 (2006.01)

(52) U.S. Cl.
CPC ........ B23K 35/3073 (2013.01); B23K 35/222 (2013.01); B23K 35/308 (2013.01); *B23K 2103/04* (2018.08)

(58) Field of Classification Search
CPC .............. B23K 35/3073; B23K 35/222; B23K 35/308; B23K 2103/04
See application file for complete search history.

(56) References Cited

U.S. PATENT DOCUMENTS

| | | | | |
|---|---|---|---|---|
| 2010/0062279 A1* | 3/2010 | Osuki | ..................... | C22C 38/40 420/584.1 |
| 2019/0084096 A1* | 3/2019 | Lee | ........................ | C22C 38/12 |
| 2020/0239986 A1* | 7/2020 | Hirata | ..................... | B23K 35/30 |
| 2021/0323101 A1 | 10/2021 | Takada et al. | | |

FOREIGN PATENT DOCUMENTS

| | | | |
|---|---|---|---|
| CN | 101395292 A | 3/2009 | |
| CN | 108971795 A | 12/2018 | |
| EP | 2 060 645 A1 | 5/2009 | |
| EP | 4 234 741 A1 | 8/2023 | |
| JP | 505244 A | 1/1975 | |
| JP | 5659597 A | 5/1981 | |
| JP | 60121099 A | 6/1985 | |
| JP | 04339591 A | 11/1992 | |
| JP | H11-197836 A | 7/1999 | |
| JP | 2007-126715 A | 5/2007 | |
| JP | 2015-206112 A | 11/2015 | |
| JP | 2016-196703 A | 11/2016 | |
| JP | 2017502842 A | 1/2017 | |
| JP | 7414126 B2 | 1/2024 | |
| KR | 10-2013-0003685 A | 1/2013 | |
| KR | 10-2016-0078621 A | 7/2016 | |
| WO | 2020039643 A1 | 2/2020 | |
| WO | 2020166538 A1 | 8/2020 | |
| WO | 2020/203334 A1 | 10/2020 | |
| WO | 2020/203335 A1 | 10/2020 | |

OTHER PUBLICATIONS

Office Action (Notice of Reasons for Refusal) issued Apr. 4, 2023, by the Japan Patent Office in corresponding Japanese Patent Application No. 2022-516104 and an English translation of the Office Action with the Concise Statement of Relevance. (11 pages).
Office Action (Notice of Reasons for Refusal) issued Aug. 15, 2023, by the Japan Patent Office in corresponding Japanese Patent Application No. 2022-516104 and an English translation of the Office Action with the Concise Statement of Relevance. (7 pages).
International Search Report and Written Opinion for International Application No. PCT/JP2021/046538, dated Mar. 1, 2022, 7 pages.
Yin et al., "Overview of Japan's low temperature structural flux-cored welding wire products" Welding Digest of Machinery Manufacturing, (Aug. 27, 2012), vol. 4, pp. 27-30, with English translation 13 pages total.
Office Action (The First Office Action) issued Jul. 25, 2024, by the State Intellectual Property Office of People's Republic of China in corresponding Chinese Patent Application No. 202180082760.X and an English translation of the Office Action. (15 pages).
Office Action (Notice of Reasons for Refusal) issued Jan. 7, 2025, by the Japan Patent Office in corresponding Japanese Patent Application No. 2023-175017 and an English Translation with the Concise Statement of Relevance of Office Action. 11 pages.

(Continued)

*Primary Examiner* — John J Norton
*Assistant Examiner* — Dilnessa B Belay
(74) *Attorney, Agent, or Firm* — Buchanan Ingersoll & Rooney PC

(57) ABSTRACT

A TIG welding filler metal is provided that has a composition including, by mass %, C: 0.20 to 0.80%, Si: 0.15 to 0.90%, Mn: 15.0 to 30.0%, P: 0.030% or less, S: 0.030% or less, Cr: 6.0 to 15.0%, and N: 0.120% or less, the balance being Fe and incidental impurities. Where necessary, the filler metal may contain one or two selected from Ni and Mo, may further contain one, or two or more selected from V, Ti, and Nb, and may additionally contain one, or two or more selected from Cu, Al, Ca, and REM. This configuration reduces the occurrence of welding cracks during TIG welding, that is, realizes excellent hot crack resistance, and allows for easy production of a weld joint having high strength and excellent cryogenic impact toughness.

14 Claims, No Drawings

(56) References Cited

OTHER PUBLICATIONS

Office Action (Request for Submission of an Opinion) issued Feb. 11, 2025, by the Korean Intellectual Property Office in corresponding Korean Patent Application No. 10-2023-7019301 and an English translation with the Concise Statement of Relevance of Office Action. (12 pages).

Extended European Search Report issued Jul. 2, 2025, by the European Patent Office in corresponding European Patent Application No. 21906693.3-1103. (88 pages).

* cited by examiner

TIG WELDING FILLER METAL AND METHOD FOR PRODUCING WELD JOINT USING THE SAME

CROSS REFERENCE TO RELATED APPLICATIONS

This is the U.S. National Phase application of PCT/JP2021/046538, filed Dec. 16, 2021, which claims priority to Japanese Patent Application No. 2020-209326, filed Dec. 17, 2020, the disclosures of these applications being incorporated herein by reference in their entireties for all purposes.

FIELD OF THE INVENTION

The present invention relates to a TIG welding filler metal, in particular, to a TIG welding filler metal that is used for welding a high-Mn content steel material for cryogenic environment use and that results in excellent hot crack resistance, specifically, is resistant to the occurrence of hot crack during welding. The present invention also relates to a method for producing a weld joint using the filler metal.

BACKGROUND OF THE INVENTION

Tungsten inert gas welding, TIG welding, is a process in which a metal is welded by melting a filler metal (a welding rod) in an arc using a non-consumable tungsten electrode rod while blowing an inert gas, such as argon gas or helium gas, to shield the welding from air. This TIG welding is applicable to various materials, such as alloy steels and non-ferrous metals, can weld even complicated shapes, and offers excellent weld quality, thus being applied for welding any metal.

Environmental regulations are more rigorous in recent years. The demand is increasing for liquefied natural gas (hereinafter, also written as LNG) that does not contain sulfur and is thus regarded as a clean fuel without emission of air pollutants, such as sulfur oxides. To ensure that LNG can be transported or stored, LNG transportation or storage containers (tanks) are required to maintain excellent cryogenic impact toughness at or below a temperature of −162° C. that is the liquefaction temperature of LNG.

To satisfy excellent cryogenic impact toughness that is required, for example, aluminum alloys, 9% Ni steel, and austenite stainless steel are conventionally used as materials for containers (tanks) or the like for the above purposes.

However, aluminum alloys have low tensile strength and entail increasing of the wall thickness of a structure that is designed. Aluminum alloys are also low in weldability. 9% Ni steel is economically disadvantageous because an expensive Ni-based material should be used as the welding material. Furthermore, austenite stainless steel has drawbacks in that it is expensive and the strength of the base material is low.

Due to these problems, recent studies of materials for LNG transportation or storage containers (tanks) are directed to high-Mn content steel containing about 10 to 35 mass % Mn (hereinafter, also written as "high-Mn steel"). High-Mn steel is characterized in that the steel has an austenite phase even at a cryogenic temperature and does not undergo brittle fracture, and also in that the steel has high strength compared with austenite stainless steel. There are also demands for the development of welding methods and welding materials capable of stably welding such high-Mn content steel materials.

To meet such demands, for example, Patent Literature 1 proposes "a high-strength weld joint having excellent cryogenic impact toughness and a flux-cored arc welding wire for the weld joint". The flux-cored arc welding wire described in Patent Literature 1 is a wire that has a composition including, by wt %, C: 0.15 to 0.8%, Si: 0.2 to 1.2%, Mn: 15 to 34%, Cr: 6% or less, Mo: 1.5 to 4%, S: 0.02% or less, P: 0.02% or less, B: 0.01% or less, Ti: 0.09 to 0.5%, N: 0.001 to 0.3%, $TiO_2$: 4 to 15%, a total of one or more selected from $SiO_2$, $ZrO_2$, and $Al_2O_3$: 0.01 to 9%, a total of one or more selected from K, Na, and Li: 0.5 to 1.7%, and one or more of F and Ca: 0.2 to 1.5%, the balance being Fe and incidental impurities. Patent Literature 1 describes that welding with the flux-cored arc welding wire can effectively produce a weld joint that has excellent low-temperature toughness with an absorbed energy of 28 J or more in a Charpy impact test at a test temperature of −196° C. and has high strength with a room-temperature tensile strength of 400 MPa or more. Furthermore, it is described that the weld joint attains excellent hot crack resistance by virtue of the Mo content in the wire composition being controlled to Mo: 1.5% or more.

Furthermore, Patent Literature 2 proposes "a gas metal arc welding solid wire". The gas metal arc welding solid wire described in Patent Literature 2 is a wire that has a composition including, by mass %, C: 0.2 to 0.8%, Si: 0.15 to 0.90%, Mn: 17.0 to 28.0%, P: 0.03% or less, S: 0.03% or less, Ni: 0.01 to 10.00%, Cr: 0.4 to 4.0%, Mo: 0.01 to 3.50%, B: less than 0.0010%, and N: 0.12% or less, the balance being Fe and incidental impurities. Where necessary, the wire may contain one, or two or more selected from V, Ti, and Nb, and one, or two or more selected from Cu, Al, Ca, and REM. Patent Literature 2 describes that welding with the gas metal arc welding solid wire generates less fume and can produce a high-strength weld joint that has high strength with a room-temperature yield strength (0.2% proof stress) of 400 MPa or more and has excellent cryogenic impact toughness with an absorbed energy $vE_{-196}$ of 28 J or more in a Charpy impact test at a test temperature of −196° C.

PATENT LITERATURE

PTL 1: Japanese Unexamined Patent Application Publication (Translation of PCT Application) No. 2017-502842
PTL 2: WO 2020/039643

SUMMARY OF THE INVENTION

However, studies by the present inventors have found that hot crack occurs during welding according to the techniques described in Patent Literature 1 and Patent Literature 2.

An object according to aspects of the present invention is to solve the problems in the art discussed above and provide a TIG welding filler metal that can reduce the occurrence of hot crack during welding and can favorably weld a high-Mn content steel material for cryogenic environment use so as to stably form a weld joint having high strength and excellent cryogenic toughness at the same time.

The term "high strength" as used herein means that the room-temperature yield strength (0.2% proof stress) of a deposited metal produced in accordance with the requirements specified in JIS Z 3111 is 400 MPa or more. The term "excellent cryogenic toughness" means that a deposited metal produced in accordance with the requirements specified in JIS Z 3111 has an absorbed energy $vE_{-196}$ of 28 J or more in a Charpy impact test at a test temperature of −196° C.

In order to achieve the above object, the present inventors carried out extensive studies first on factors that would affect hot crack during TIG welding of high-Mn steel. As a result, the present inventors have found that one of the factors giving rise to hot crack is the segregation of P into the last-solidified region of the weld metal. Furthermore, the present inventors have found that 6.0 mass % or more Cr present in the composition of the filler metal forms Cr phosphides in the liquid phase of the weld metal to reduce the segregation of P into the last-solidified region of the weld metal, and thereby further acts to suppress the occurrence of hot crack.

The present inventors also studied the composition of a TIG welding filler metal that would be necessary in order for a deposited metal produced in accordance with the requirements specified in JIS Z 3111 to achieve the desired high strength and the desired excellent cryogenic toughness at the same time. As a result, the present inventors have found that the composition of the TIG welding filler metal needs to be such that the contents of C and Si are controlled to the ranges of, by mass %, C: 0.20 to 0.80% and Si: 0.15 to 0.90%, the contents of Mn and Cr are controlled to the specific ranges of Mn: 15.0 to 30.0% and Cr: 6.0 to 15.0%, and the contents of P, S, and N are reduced to P: 0.030% or less, S: 0.030% or less, and N: 0.120% or less. That is, the weld joint is to be fabricated using the above filler metal.

Aspects of the present invention have been completed based on the above finding and further studies. A summary of aspects of the present invention is as follows.

[1] A TIG welding filler metal having a composition including, by mass %, C: 0.20 to 0.80%, Si: 0.15 to 0.90%, Mn: 15.0 to 30.0%, P: 0.030% or less, S: 0.030% or less, Cr: 6.0 to 15.0%, and N: 0.120% or less, the balance being Fe and incidental impurities.

[2] The TIG welding filler metal according to [1], wherein the composition further includes, by mass %, one or two selected from Ni: 10.00% or less and Mo: 3.50% or less.

[3] The TIG welding filler metal according to [1] or [2], wherein the composition further includes, by mass %, one, or two or more selected from V: 1.00% or less, Ti: 1.00% or less, and Nb: 1.00% or less.

[4] The TIG welding filler metal according to any one of [1] to [3], wherein the composition further includes, by mass %, one, or two or more selected from Cu: 1.00% or less, Al: 0.100% or less, Ca: 0.010% or less, and REM: 0.020% or less.

[5] A method for producing a weld joint, including TIG welding a high-Mn content steel material using the TIG welding filler metal described in any one of [1] to [4], and a non-consumable electrode.

[6] The method for producing a weld joint according to [5], wherein the Mn content, by mass %, in a composition of the high-Mn content steel material is 15.0 to 30.0%.

[7] The method for producing a weld joint according to [6], wherein the high-Mn content steel material has a composition including, by mass %, C: 0.10 to 0.80%, Si: 0.05 to 1.00%, Mn: 15.0 to 30.0%, P: 0.030% or less, S: 0.030% or less, Cr: 2.5 to 15.0%, and N: 0.120% or less, the balance being Fe and incidental impurities.

[8] The method for producing a weld joint according to [6] or [7], wherein the composition of the high-Mn content steel material further includes, by mass %, one or two selected from Ni: 10.00% or less and Mo: 3.50% or less.

[9] The method for producing a weld joint according to any one of [6] to [8], wherein the composition of the high-Mn content steel material further includes, by mass %, one, or two or more selected from V: 2.00% or less, Ti: 1.00% or less, and Nb: 1.00% or less.

[10] The method for producing a weld joint according to any one of [6] to [9], wherein the composition of the high-Mn content steel material further includes, by mass %, one, or two or more selected from Cu: 1.00% or less, Al: 0.100% or less, Ca: 0.010% or less, and REM: 0.020% or less.

The TIG welding filler metal according to aspects of the present invention is a welding material that can weld a high-Mn content steel material with reduced occurrence of hot crack during TIG welding so as to easily produce a weld joint having high strength and excellent cryogenic toughness, thus attaining significant effects in industry.

DETAILED DESCRIPTION OF EMBODIMENTS OF THE INVENTION

Aspects of the present invention pertain to a filler metal suited for TIG welding of a high-Mn content steel material. The use of the filler metal according to aspects of the present invention can reduce the occurrence of hot crack during TIG welding of high-Mn content steel materials. A test plate should be constrained or reverse strained beforehand so that the angular deformation after welding will not be 5° or more to ensure sampling of test specimens. The groove is a V-shape and formed including a backing metal. Unless otherwise specified, welding is performed in a flat position, and the first and second layers are formed by one- or two-pass welding, and the third and subsequent layers are formed by one, or two or more welding passes. The welded test specimens should not be heat-treated.

More preferably, the filler metal according to aspects of the present invention is a welding material that can produce a weld joint with high strength and excellent cryogenic toughness. Specifically, a deposited metal produced by TIG welding in accordance with JIS Z 3111 has high strength with a 0.2% proof stress at room temperature of 400 MPa or more, and has excellent cryogenic toughness with an absorbed energy of 28 J or more in a Charpy impact test at a test temperature of −196° C.

[TIG Welding]

As already described, TIG welding is a process in which a metal is welded by melting a filler metal in an arc using a non-consumable tungsten electrode rod while blowing argon gas or helium gas to shield the welding from air. This TIG welding is applicable to various materials, such as alloy steels and non-ferrous metals, can weld even complicated shapes, and offers excellent weld quality, thus being applied for welding any metal.

For example, the TIG welding process is carried out in the following manner. Steel plates or steel materials (thickness: 3 to 100 mm) as a base material are butted against each other in accordance with JIS Z 3111 and form a 45° V-shaped groove. A pure tungsten rod (3.2 mmø) as an electrode, and a filler metal (diameter: 2.0 mmø) are positioned in a flat position. No preheating is performed. The base material is then welded under conditions in which current: 180 to 250 A (DCEN), voltage: 10 to 15 V, welding speed: 5 to 15 cm/min, welding heat input: 0.7 to 4.0 kJ/mm, interpass temperature: 100 to 150° C., shield gas: Ar, and gas flow rate: 10 to 25 L/min.

[Basic Composition of Filler Metals]

The basic composition of the TIG welding filler metal according to aspects of the present invention includes, by mass %, C: 0.20 to 0.80%, Si: 0.15 to 0.90%, Mn: 15.0 to 30.0%, P: 0.030% or less, S: 0.030% or less, Cr: 6.0 to 15.0%, and N: 0.120% or less, the balance being Fe and incidental impurities. First, the reasons as to why the basic composition is thus limited will be described. In the following, "%" in the composition means "mass %".

[C: 0.20 to 0.80%]

Carbon is an element that acts to increase the strength of a weld metal by solid solution hardening, and also stabilizes the austenite phase to enhance the cryogenic impact toughness of a weld metal. In order to obtain these effects, the C content needs to be 0.20% or more. When, however, the C content exceeds 0.80%, carbides are precipitated to cause a decrease in cryogenic toughness and to increase the probability of welding cracks (hot crack) during welding. Thus, the C content is limited to the range of 0.20 to 0.80%. The C content is preferably 0.40% or more. The C content is preferably 0.60% or less. The C content is more preferably 0.45% or more. The C content is more preferably 0.55% or less.

[Si: 0.15 to 0.90%]

Silicon acts as a deoxidizing agent to increase the yield of Mn, and also increases the viscosity of a melt metal to effectively allow a bead to maintain the shape stably. In order to obtain these effects, the Si content needs to be 0.15% or more. When, however, the Si content exceeds 0.90%, the cryogenic toughness of a weld metal is lowered. Furthermore, silicon segregates during solidification to form liquid phases at interfaces of solidified cells, causing a decrease in hot crack resistance. Thus, the Si content is limited to the range of 0.15 to 0.90%. The Si content is preferably 0.20% or more. The Si content is preferably 0.70% or less. The Si content is more preferably 0.30% or more. The Si content is more preferably 0.60% or less.

[Mn: 15.0 to 30.0%]

Manganese is an element that stabilizes the austenite phase at low cost, and needs to be contained at 15.0% or more in accordance with aspects of the present invention. When the Mn content is less than 15.0%, ferrite phases are formed in a weld metal to cause a significant decrease in toughness at cryogenic temperatures. When, on the other hand, the Mn content exceeds 30.0%, manganese segregates excessively during solidification to induce welding cracks (hot crack). Thus, the Mn content is limited to the range of 15.0 to 30.0%. The Mn content is preferably 18.0% or more. The Mn content is preferably 27.0% or less. The Mn content is more preferably 20.0% or more. The Mn content is more preferably 26.0% or less.

[P: 0.030% or less]

Phosphorus is an element that segregates at crystal grain boundaries to induce hot crack. It is therefore preferable to remove as much phosphorus as possible. Up to 0.030% phosphorus is acceptable. Thus, the P content is limited to 0.030% or less. Excessive dephosphorization raises the refining costs. Thus, the P content is preferably controlled to 0.003% or more. The P content is more preferably 0.005% or more. The P content is more preferably 0.020% or less.

[S: 0.030% or less]

In a weld metal, sulfur is present as sulfide inclusion MnS. MnS serves as fracture starting points and lowers the cryogenic toughness. Thus, the S content is limited to 0.030% or less. Excessive desulfurization raises the refining costs. Thus, the S content is preferably controlled to 0.001% or more. The S content is more preferably 0.003% or more. The S content is more preferably 0.020% or less.

[Cr: 6.0 to 15.0%]

Chromium acts as an element that stabilizes the austenite phase at cryogenic temperatures to enhance the cryogenic toughness of a weld metal. Chromium also acts to enhance the strength of a weld metal. Furthermore, chromium narrows the temperature range of the solid-liquid coexistence region of a melt metal to effectively suppress the occurrence of hot crack, and also forms Cr phosphides in the liquid phase to suppress hot crack caused by phosphorus. In order to obtain these effects, the Cr content needs to be 6.0% or more. When the Cr content is less than 6.0%, the above effects cannot be ensured. When, on the other hand, the Cr content exceeds 15.0%, Cr carbides are formed to cause a decrease in cryogenic toughness. Thus, the Cr content is limited to the range of 6.0 to 15.0%. The Cr content is preferably more than 7.0% and the Cr content is preferably 15.0% or less. The Cr content is more preferably 8.0% or more. The Cr content is more preferably 13.0% or less.

[N: 0.120% or less]

Nitrogen is an element that is incidentally contained. Acting similarly to carbon, nitrogen effectively contributes to an enhancement in the strength of a weld metal and stabilizes the austenite phase to contribute to a stable enhancement in cryogenic toughness. These effects are noticeable when the N content is 0.003% or more. When, on the other hand, the N content exceeds 0.120%, nitrides are formed to cause a decrease in low-temperature toughness. Thus, the N content is limited to 0.120% or less. The N content is preferably 0.004% or more. The N content is preferably 0.080% or less. The N content is more preferably 0.010% or more. The N content is more preferably 0.060% or less.

[Optional Components]

The components described hereinabove are the basic components in the filler metal according to aspects of the present invention. Where necessary, the filler metal according to aspects of the present invention may contain one or two optional components selected from Ni: 10.00% or less and Mo: 3.50% or less in addition to the basic composition described above. Furthermore, the filler metal may additionally contain one, or two or more selected from V: 1.00% or less, Ti: 1.00% or less, and Nb: 1.00% or less. Furthermore, the filler metal may additionally contain one, or two or more selected from Cu: 1.00% or less, Al: 0.100% or less, Ca: 0.010% or less, and REM: 0.020% or less.

[Ni: 10.00% or Less and Mo: 3.50% or Less]

Both nickel and molybdenum are elements that strengthen austenite grain boundaries. Either or both may be selected and added as required.

[Ni: 10.00% or Less]

Nickel is an element that strengthens austenite grain boundaries, and segregates at grain boundaries to enhance the cryogenic toughness. Furthermore, nickel also has an effect of stabilizing the austenite phase. Thus, an increase in the Ni content leads to stabilization of the austenite phase and enhances the cryogenic toughness of a weld metal. However, increasing the Ni content in excess of 10.00% is economically disadvantageous because of the expensiveness of the element. Thus, the Ni content is preferably limited to 10.00% or less. The Ni content is more preferably in the range of 8.00% or less. The Ni content is still more preferably in the range of 6.00% or less.

[Mo: 3.50% or Less]

Molybdenum is an element that strengthens austenite grain boundaries, and segregates at grain boundaries to enhance the strength of a weld metal. Furthermore, molybdenum also acts to enhance the strength of a weld metal by solid solution hardening. When, on the other hand, the Mo content exceeds 3.50%, molybdenum may be precipitated as carbides, which serve as fracture starting points and can cause a decrease in cryogenic toughness. Thus, the Mo content is preferably limited to the range of 3.50% or less. The Mo content is more preferably in the range of 3.00% or less. The Mo content is preferably 1.00% or more and the Mo content is preferably 3.00% or less.

[V: 1.00% or Less, Ti: 1.00% or Less, and Nb: 1.00% or Less]

Vanadium, titanium, and niobium are all elements that promote the formation of carbides and contribute to an enhancement in the strength of a weld metal. One, or two or more may be selected and added as required.

[V: 1.00% or Less]

Vanadium is a carbide-forming element and is precipitated as fine carbides to contribute to an enhancement in the strength of a weld metal. In order to obtain these effects, the V content is preferably 0.001% or more. When, however, the V content exceeds 1.00%, carbides are coarsened and come to serve as fracture starting points to cause a decrease in cryogenic toughness. Thus, when vanadium is present, the content thereof is preferably limited to 1.00% or less. The V content is preferably 0.002% or more. The V content is preferably 0.60% or less. The V content is more preferably 0.005% or more. The V content is more preferably 0.20% or less.

[Ti: 1.00% or Less]

Titanium is a carbide-forming element and is precipitated as fine carbides to contribute to an enhancement in the strength of a weld metal. Furthermore, titanium is precipitated as carbides at interfaces of solidified cells of a weld metal, and thereby contributes to the suppression of the occurrence of hot crack. In order to obtain these effects, the Ti content is preferably 0.001% or more. When, however, the Ti content exceeds 1.00%, carbides are coarsened and come to serve as fracture starting points to cause a decrease in cryogenic toughness. Thus, when titanium is present, the content thereof is preferably limited to 1.00% or less. The Ti content is preferably 0.002% or more. The Ti content is preferably 0.60% or less. The Ti content is more preferably 0.005% or more. The Ti content is more preferably 0.20% or less.

[Nb: 1.00% or Less]

Niobium is a carbide-forming element and is precipitated as carbides to contribute to an enhancement in the strength of a weld metal. Furthermore, niobium is precipitated as carbides at interfaces of solidified cells of a weld metal, and thereby contributes to the suppression of the occurrence of hot crack. In order to obtain these effects, the Nb content is preferably 0.001% or more. When, however, the Nb content exceeds 1.00%, carbides are coarsened and come to serve as fracture starting points to cause a decrease in cryogenic toughness. Thus, when niobium is present, the content thereof is preferably limited to 1.00% or less. The Nb content is more preferably 0.002% or more. The Nb content is preferably 0.60% or less. The Nb content is still more preferably 0.005% or more. The Nb content is still more preferably 0.30% or less.

[Cu: 1.00% or Less, Al: 0.100% or Less, Ca: 0.010% or Less, and REM: 0.020% or Less]

Copper is an element that contributes to austenite stabilization. Aluminum is an element that contributes to the stabilization of bead shape. Calcium and REM are elements that contribute to an enhancement in workability. One, or two or more may be selected and added as required.

[Cu: 1.00% or Less]

Copper is an element that stabilizes the austenite phase, and stabilizes the austenite phase even at cryogenic temperatures to enhance the cryogenic toughness of a weld metal. In order to obtain these effects, the Cu content is preferably 0.01% or more. When, however, the Cu content exceeds 1.00%, copper segregates during solidification to induce hot crack. Thus, when copper is present, the content thereof is preferably limited to 1.00% or less. The Cu content is preferably 0.01% or more. The Cu content is preferably 0.60% or less. The Cu content is more preferably 0.10% or less.

[Al: 0.100% or Less]

Aluminum acts as a deoxidizing agent, and has an important action to increase the viscosity of a melt metal and allow the bead shape to be maintained stably. Furthermore, aluminum narrows the temperature range of the solid-liquid coexistence region of a melt metal to contribute to the suppression of the occurrence of hot crack of a weld metal. These effects are noticeable when the Al content is 0.005% or more. Thus, the Al content is preferably 0.005% or more. When, however, the Al content exceeds 0.100%, the viscosity of a melt metal is so increased that a bead does not spread to increase the probability of defects, such as incomplete fusion. Thus, when aluminum is present, the content thereof is preferably limited to 0.100% or less. The Al content is more preferably 0.005% or more and the Al content is more preferably 0.060% or less. The Al content is still more preferably 0.020% or less.

[Ca: 0.010% or Less]

Calcium binds to sulfur in a melt metal to form the high-melting sulfide CaS. CaS has a higher melting point than MnS and thus contributes to the suppression of the occurrence of hot crack of a weld metal. These effects are noticeable when the Ca content is 0.001% or more. When, on the other hand, the Ca content exceeds 0.010%, the arc is disturbed during welding to make it difficult to perform welding stably. Thus, when calcium is present, the content thereof is preferably limited to 0.010% or less. The Ca content is more preferably 0.001% or more and the Ca content is more preferably 0.008% or less.

[REM: 0.020% or Less]

REM indicates rare earth elements, such as Sc, Y, La, and Ce. REM are powerful deoxidizing agents and are present in the form of REM oxides in a weld metal. The REM oxides serve as nucleus formation sites at the time of solidification, and thereby reduce the size of crystal grains and contribute to an enhancement in the strength of a weld metal. These effects are noticeable when the REM content is 0.001% or more. When, however, the REM content exceeds 0.020%, the arc stability is lowered. Thus, when REM are present, the content thereof is preferably limited to 0.020% or less. The REM content is more preferably 0.002% or more. The REM content is preferably 0.018% or less. The REM content is still more preferably 0.010% or less.

[Balance Components]

The balance other than the components described above is Fe and incidental impurities. Examples of the incidental impurities include O, Sn, Sb, As, Pb, and Bi. It is preferable that the amount of O in the filler metal be controlled to 0.15% or less, the amounts of Sn, Sb, and As be each controlled to 0.005% or less, and the amounts of Pb and Bi be each controlled to 0.0001% or less. As long as the basic composition and the contents of optional components described above are satisfied, the filler metal may contain other elements not mentioned above. Such embodiments are also within the technical scope according to aspects of the present invention.

[Methods for Manufacturing Filler Metals]

Next, methods for manufacturing the TIG welding filler metals according to aspects of the present invention will be described.

The filler metal according to aspects of the present invention may be manufactured by any method without limitation as long as the molten steel that is used has the chemical composition described hereinabove. Any of the conventional filler metal manufacturing methods may be used.

For example, the filler metal according to aspects of the present invention is preferably obtained by a casting step in which a molten steel having the above-described chemical composition is smelted in a usual steelmaking furnace, such as an electric furnace or a vacuum melting furnace, and is cast into, for example, a mold having a predetermined shape; a heating step in which the steel ingot obtained is heated to a predetermined temperature; a hot rolling step in which the steel ingot heated is hot rolled to give a steel material (a rod) having a predetermined shape; and a cold rolling step in which the steel material (the rod) obtained is cold rolled (cold drawn) several times and, where necessary, is subjected to an annealing step at an annealing temperature of 900 to 1200° C. to give a wire-like shape having a desired size.

[Methods for Producing Weld Joints]

A method will be described in which a weld joint is produced by welding steel materials as a base material by a TIG welding process using the TIG welding filler metal described hereinabove.

Steel materials as a base material are butted against each other, and the TIG welding filler metal that has the chemical composition described hereinabove is fed continuously. An arc is generated with a tungsten electrode rod to weld the metals while blowing an inert gas. A weld joint can be thus produced.

[Steel Materials]

The steel material as a base material is preferably a high-Mn content steel material. Preferably, the high-Mn content steel material is a cryogenic high-strength steel material, and the Mn content by mass % is 15.0 to 30.0%. Specifically, the steel material has a basic composition including, by mass %, C: 0.10 to 0.80%, Si: 0.05 to 1.00%, Mn: 15.0 to 30.0%, P: 0.030% or less, S: 0.030% or less, Cr: 2.5 to 15.0%, and N: 0.120% or less, the balance being Fe and incidental impurities. Where necessary, the steel material may contain one or two optional components selected from Ni: 10.00% or less and Mo: 3.50% or less in addition to the above basic composition. Furthermore, the steel material may additionally contain one, or two or more selected from V: 2.00% or less, Ti: 1.00% or less, and Nb: 1.00% or less. Furthermore, the steel material may additionally contain one, or two or more selected from Cu: 1.00% or less, Al: 0.100% or less, Ca: 0.010% or less, and REM: 0.020% or less.

To produce the high-Mn content steel material, for example, a steel material obtained by conventional steelmaking and casting processes may be hot rolled while controlling conditions, such as heating conditions and rolling reduction, and the hot rolled steel may be then cooled to give a steel material (a steel plate). For example, the thickness of the rolled steel plate is 3 to 100 mm.

EXAMPLES

Hereinbelow, the present invention will be further described based on EXAMPLES. EXAMPLES below are only illustrative of detailed examples of the present invention and do not limit the scope of the present invention.

Molten steels having a composition described in Table 1 were smelted in a vacuum melting furnace and were cast to form steel ingots weighing 1000 kg. The steel ingots obtained were heated to 1200° C., hot rolled, then cold rolled, and optionally annealed (900 to 1200° C.) as required to give TIG welding filler metals having a diameter of 2.0 mmø and a length of 1000 mm.

Next, cryogenic high-Mn content steel plates (thickness: 12 mm) were provided as test plates. The test plates were butted against each other in accordance with JIS Z 3111 and a 450 V-shaped groove was formed. TIG welding was performed using the filler metal to form a deposited metal in the groove. The cryogenic high-Mn content steel plates used as the test plates were steel plates that had a composition including 0.5% C, 0.4% Si, 25% Mn, 3% Cr, and the balance of Fe.

In the TIG welding, the filler metal (diameter: 2.0 mmø) having a composition described in Table 1 was fed in a flat position without being preheated, and welding was performed using a pure tungsten rod (3.2 mmø) as an electrode under conditions in which current: 200 A (DCEN), voltage: 12 V, welding speed: 8 cm/min, interpass temperature: 100 to 150° C., and shield gas: Ar.

[Hot Crack Resistance]

After the welding, the deposited metal was observed with an optical microscope (×30 magnification) to determine the presence or absence of welding cracks. The welding cracks are hot cracks. When cracking was present, the hot crack resistance was low and was rated as "x". When no cracking was found, the hot crack resistance was excellent and was rated as "○"

[Characteristics of Deposited Metals]

A test piece for tensile test (diameter of parallel part: 6 mmø) of the deposited metal and a Charpy impact test specimen (V-notch) of the deposited metal were sampled from the deposited metal and were subjected to a tensile test and an impact test in accordance with the requirements specified in JIS Z 3111.

[Tensile Test: 0.2% Proof Stress (MPa)]

Three test pieces were tensile tested at room temperature, and the results (0.2% proof stress) obtained were averaged to give tensile characteristics of the deposited metal using the filler metal. As described hereinabove, the target value of 0.2% proof stress at room temperature in accordance with aspects of the present invention is 400 MPa or more.

[Impact Test: Absorbed Energy $vE_{-196}$ (J)]

Three Charpy impact test specimens were tested at a test temperature of −196° C. to determine the absorbed energy $vE_{-196}$. The results were averaged to give the cryogenic toughness of the deposited metal using the filler metal. As described hereinabove, the target value of the absorbed energy $vE_{-196}$ in accordance with aspects of the present invention is 28 J or more.

The results obtained are described in Table 2.

Furthermore, the INVENTIVE EXAMPLES satisfied the target values described hereinabove, specifically, had a yield strength (0.2% proof stress) at room temperature of 400 MPa

TABLE 1

| Steel No. | Chemical composition (mass %) | | | | | | | | | | | Remarks |
|---|---|---|---|---|---|---|---|---|---|---|---|---|
| | C | Si | Mn | P | S | Cr | N | Ni | Mo | V, Ti, Nb | Cu, Al, Ca, REM | INV. EX. |
| A | 0.27 | 0.76 | 25.3 | 0.013 | 0.012 | 13.5 | 0.094 | — | — | — | — | INV. EX. |
| B | 0.64 | 0.44 | 20.8 | 0.024 | 0.004 | 8.6 | 0.042 | — | — | V: 0.08 | Al: 0.009 | INV. EX. |
| C | 0.45 | 0.52 | 23.0 | 0.014 | 0.008 | 11.2 | 0.085 | 4.60 | — | — | — | INV. EX. |
| D | 0.53 | 0.51 | 26.4 | 0.008 | 0.014 | 10.0 | 0.050 | — | 2.80 | — | — | INV. EX. |
| E | 0.65 | 0.58 | 26.0 | 0.012 | 0.021 | 7.2 | 0.020 | 6.91 | 1.51 | — | Al: 0.004 | INV. EX. |
| F | 0.72 | 0.42 | 17.4 | 0.005 | 0.016 | 7.5 | 0.100 | 4.17 | 1.25 | — | Al: 0.002 | INV. EX. |
| G | 0.55 | 0.26 | 23.4 | 0.017 | 0.024 | 7.4 | 0.081 | 3.10 | 0.02 | — | Al: 0.012 | INV. EX. |
| H | 0.72 | 0.37 | 27.1 | 0.013 | 0.011 | 8.3 | 0.012 | 5.27 | 0.12 | Nb: 0.06 | — | INV. EX. |
| I | 0.40 | 0.49 | 22.5 | 0.006 | 0.005 | 8.1 | 0.103 | 3.33 | 3.04 | — | Cu: 0.02 | INV. EX. |
| J | 0.33 | 0.31 | 19.9 | 0.022 | 0.026 | 10.8 | 0.025 | 0.25 | 0.60 | V: 0.11, Nb: 0.16 | Al: 0.010 | INV. EX. |
| K | 0.55 | 0.19 | 26.3 | 0.024 | 0.025 | 11.6 | 0.058 | 2.94 | 1.02 | V: 0.02 | — | INV. EX. |
| L | 0.42 | 0.62 | 23.5 | 0.014 | 0.010 | 6.2 | 0.025 | 9.20 | 2.02 | — | — | INV. EX. |
| M | 0.77 | 0.75 | 28.4 | 0.005 | 0.006 | 14.1 | 0.074 | 6.32 | 1.24 | — | Cu: 0.03, Al: 0.016 | INV. EX. |
| N | 0.29 | 0.21 | 16.5 | 0.022 | 0.013 | 7.5 | 0.084 | 2.62 | 2.72 | Ti: 0.03 | — | INV. EX. |
| O | 0.42 | 0.84 | 29.0 | 0.006 | 0.010 | 6.5 | 0.010 | 3.06 | 0.65 | — | — | INV. EX. |
| P | 0.67 | 0.69 | 25.3 | 0.005 | 0.021 | 12.2 | 0.060 | 4.52 | 2.13 | — | REM: 0.006 | INV. EX. |
| Q | 0.43 | 0.41 | 19.7 | 0.005 | 0.006 | 9.1 | 0.079 | 4.85 | 0.97 | — | REM: 0.004 | INV. EX. |
| R | 0.35 | 0.53 | 20.1 | 0.008 | 0.003 | 10.1 | 0.052 | 2.35 | 3.06 | — | — | INV. EX. |
| S | 0.69 | 0.43 | 24.2 | 0.049 | 0.013 | 13.7 | 0.042 | 2.68 | 0.52 | — | REM: 0.004 | COMP. EX. |
| T | 0.48 | 0.72 | 26.0 | 0.007 | 0.064 | 10.9 | 0.065 | 6.11 | 1.80 | V: 0.06 | — | COMP. EX. |
| U | 0.56 | 0.47 | 19.3 | 0.005 | 0.006 | 2.3 | 0.067 | 5.83 | 1.71 | V: 0.04, Ti: 0.12 | Cu: 0.01, Ca: 0.001 | COMP. EX. |
| V | 1.21 | 0.85 | 35.4 | 0.015 | 0.015 | 11.8 | 0.044 | 8.33 | 2.59 | — | Al: 0.005 | COMP. EX. |
| W | 0.06 | 0.65 | 23.6 | 0.008 | 0.010 | 6.8 | 0.039 | 1.08 | 1.03 | Ti: 0.08 | Al: 0.009 | COMP. EX. |
| X | 0.40 | 0.26 | 11.9 | 0.024 | 0.009 | 7.3 | 0.097 | 0.71 | 1.98 | — | — | COMP. EX. |
| Y | 0.49 | 0.79 | 23.1 | 0.016 | 0.019 | 13.0 | 0.022 | 1.81 | 5.16 | Nb: 0.02 | — | COMP. EX. |
| Z | 0.72 | 1.12 | 23.7 | 0.003 | 0.022 | 9.8 | 0.095 | 8.91 | 1.66 | — | — | COMP. EX. |

TABLE 2

| Filler metal No. | Steel No. | Hot crack resistance | Deposited metal characteristics* | | Remarks |
|---|---|---|---|---|---|
| | | | 0.2% Proof stress (MPa) | Absorbed energy $vE_{-196}$ (J) | |
| 1 | A | ○ | 484 | 66 | INV. EX. |
| 2 | B | ○ | 431 | 51 | INV. EX. |
| 3 | C | ○ | 460 | 66 | INV. EX. |
| 4 | D | ○ | 474 | 47 | INV. EX. |
| 5 | E | ○ | 440 | 53 | INV. EX. |
| 6 | F | ○ | 447 | 49 | INV. EX. |
| 7 | G | ○ | 426 | 52 | INV. EX. |
| 8 | H | ○ | 429 | 59 | INV. EX. |
| 9 | I | ○ | 478 | 54 | INV. EX. |
| 10 | J | ○ | 458 | 55 | INV. EX. |
| 11 | K | ○ | 475 | 62 | INV. EX. |
| 12 | L | ○ | 420 | 51 | INV. EX. |
| 13 | M | ○ | 510 | 74 | INV. EX. |
| 14 | N | ○ | 441 | 41 | INV. EX. |
| 15 | O | ○ | 409 | 48 | INV. EX. |
| 16 | P | ○ | 495 | 62 | INV. EX. |
| 17 | Q | ○ | 444 | 56 | INV. EX. |
| 18 | R | ○ | 475 | 48 | INV. EX. |
| 19 | S | x | 477 | 58 | COMP. EX. |
| 20 | T | ○ | 454 | 22 | COMP. EX. |
| 21 | U | x | 354 | 15 | COMP. EX. |
| 22 | V | x | 483 | 26 | COMP. EX. |
| 23 | W | ○ | 392 | 24 | COMP. EX. |
| 24 | X | ○ | 413 | 10 | COMP. EX. |
| 25 | Y | ○ | 511 | 7 | COMP. EX. |
| 26 | Z | x | 444 | 21 | COMP. EX. |

*In accordance with JIS Z 3111

The welding materials of INVENTIVE EXAMPLES successfully formed a deposited metal that was free from hot crack during welding, namely, had excellent hot crack resistance.

or more, and an absorbed energy $vE_{-196}$ of 28 J or more in the Charpy impact test at a test temperature of −196° C. Thus, the filler metals were demonstrated to be capable of giving a weld metal having high strength and excellent cryogenic toughness at the same time.

In contrast, the deposited metals obtained in COMPARATIVE EXAMPLES outside the range of the present invention were low in hot crack resistance and suffered hot cracks, or had a 0.2% proof stress at room temperature of less than 400 MPa and/or an absorbed energy $vE_{-196}$ of less than 28 J, thus failing to achieve the target strength and the target cryogenic toughness at the same time.

COMPARATIVE EXAMPLES will be discussed individually below.

The filler metal No. 19 had a higher P content than the range of the present invention, and consequently phosphorus had segregated into the last-solidified regions during the welding, thus causing hot crack.

The filler metal No. 20 had a higher S content than the range of the present invention, and MnS possibly serving as fracture starting points was formed. Consequently, the deposited metal had an absorbed energy $vE_{-196}$ of less than 28 J at a test temperature of −196° C. and failed to attain the desired excellent cryogenic toughness.

The filler metal No. 21 had a lower Cr content than the range of the present invention, and consequently the deposited metal had a 0.2% proof stress of less than 400 MPa and failed to achieve the desired high strength. Furthermore, segregation of phosphorus into the last-solidified regions during the welding could not be suppressed, thus causing welding cracks (hot crack). Furthermore, the deposited metal had an absorbed energy $vE_{-196}$ of less than 28 J at a test temperature of −196° C. and failed to attain the desired excellent cryogenic toughness.

The filler metal No. 22 had higher C and Mn contents than the ranges of the present invention, and consequently carbides and manganese had segregated into the last-solidified regions during the welding, thus causing welding cracks (hot crack). Furthermore, the carbides served as fracture starting points, and the deposited metal had an absorbed energy $vE_{-196}$ of less than 28 J at a test temperature of −196° C. and failed to attain the desired excellent cryogenic toughness.

The filler metal No. 23 had a lower C content than the range of the present invention. Consequently, the deposited metal had a 0.2% proof stress of less than 400 MPa and failed to achieve the desired high strength, and further had an absorbed energy $vE_{-196}$ of less than 28 J at a test temperature of −196° C. and failed to attain the desired excellent cryogenic toughness.

The filler metal No. 24 had a lower Mn content than the range of the present invention, and consequently the austenite phase was unstable. Thus, the deposited metal had an absorbed energy $vE_{-196}$ of less than 28 J at a test temperature of −196° C. and failed to attain the desired excellent cryogenic toughness.

The filler metal No. 25 had a higher Mo content than the range of the present invention, and consequently Mo carbides possibly serving as fracture starting points were formed. Thus, the deposited metal had an absorbed energy $vE_{-196}$ of less than 28 J at a test temperature of −196° C. and failed to attain the desired excellent cryogenic toughness.

The filler metal No. 26 had a higher Si content than the range of the present invention, and consequently silicon had segregated into the last-solidified regions during the welding, thus causing welding cracks (hot crack). Furthermore, the deposited metal had an absorbed energy $vE_{-196}$ of less than 28 J at a test temperature of −196° C. and failed to attain the desired excellent cryogenic toughness.

The invention claimed is:

1. A TIG welding filler metal having a composition consisting of, by mass %, C: 0.20 to 0.80%, Si: 0.15 to 0.90%, Mn: 15.0 to 30.0%, P: 0.030% or less, S: 0.030% or less, Cr: 6.0 to 15.0%, and N: 0.120% or less,
the balance being Fe and incidental impurities.

2. The TIG welding filler metal according to claim 1, wherein the composition consists of, by mass %, C: 0.20 to 0.80%, Si: 0.15 to 0.90%, Mn: 15.0 to 30.0%, P: 0.030% or less, S: 0.030% or less, Cr: 6.2 to 15.0%, and N: 0.120% or less, the balance being Fe and incidental impurities.

3. The TIG welding filler metal according to claim 1, wherein the composition consists of, by mass %, C: 0.20 to 0.80%, Si: 0.15 to 0.90%, Mn: 15.0 to 30.0%, P: 0.030% or less, S: 0.030% or less, Cr: 6.5 to 15.0%, and N: 0.120% or less, the balance being Fe and incidental impurities.

4. A method for producing a weld joint, comprising TIG welding a high-Mn content steel material using the TIG welding filler metal described in claim 1, and a non-consumable electrode.

5. The method for producing a weld joint according to claim 4, wherein the Mn content, by mass %, in a composition of the high-Mn content steel material is 15.0 to 30.0%.

6. The method for producing a weld joint according to claim 5, wherein the high-Mn content steel material has a composition comprising, by mass %, C: 0.10 to 0.80%, Si: 0.05 to 1.00%, Mn: 15.0 to 30.0%, P: 0.030% or less, S: 0.030% or less, Cr: 2.5 to 15.0%, and N: 0.120% or less, the balance being Fe and incidental impurities.

7. The method for producing a weld joint according to claim 5, wherein the composition of the high-Mn content steel material further comprises, by mass %, at least one of following;
Ni: 10.00% or less, Mo: 3.50% or less,
V: 2.00% or less, Ti: 1.00% or less, Nb: 1.00% or less,
Cu: 1.00% or less, Al: 0.100% or less, Ca: 0.010% or less, and REM: 0.020% or less.

8. The method for producing a weld joint according to claim 6, wherein the composition of the high-Mn content steel material further comprises, by mass %, at least one of following;
Ni: 10.00% or less, Mo: 3.50% or less,
V: 2.00% or less, Ti: 1.00% or less, Nb: 1.00% or less,
Cu: 1.00% or less, Al: 0.100% or less, Ca: 0.010% or less, and REM: 0.020% or less.

9. A TIG welding filler metal having a composition consisting of, by mass %, C: 0.20 to 0.80%, Si: 0.15 to 0.90%, Mn: 15.0 to 30.0%, P: 0.030% or less, S: 0.030% or less, Cr: 6.0 to 15.0%, N: 0.120% or less,
Ni: 0% or more and 10.00% or less, Mo: 0% or more and 3.50% or less,
V: 0% or more and 1.00% or less, Ti: 0% or more and 1.00% or less, Nb: 0% or more and 1.00% or less,
Cu: 0% or more and 1.00% or less, Al: 0% or more and 0.100% or less, Ca: 0% or more and 0.010% or less, and REM: 0% or more and 0.020% or less,
the balance being Fe and incidental impurities.

10. A method for producing a weld joint, comprising TIG welding a high-Mn content steel material using the TIG welding filler metal described in claim 9, and a non-consumable electrode.

11. The method for producing a weld joint according to claim 10, wherein the Mn content, by mass %, in a composition of the high-Mn content steel material is 15.0 to 30.0%.

12. The method for producing a weld joint according to claim 11, wherein the high-Mn content steel material has a composition comprising, by mass %, C: 0.10 to 0.80%, Si: 0.05 to 1.00%, Mn: 15.0 to 30.0%, P: 0.030% or less, S: 0.030% or less, Cr: 2.5 to 15.0%, and N: 0.120% or less, the balance being Fe and incidental impurities.

13. The method for producing a weld joint according to claim 11, wherein the composition of the high-Mn content steel material further comprises, by mass %, at least one of following;
Ni: 10.00% or less, Mo: 3.50% or less,
V: 2.00% or less, Ti: 1.00% or less, Nb: 1.00% or less,
Cu: 1.00% or less, Al: 0.100% or less, Ca: 0.010% or less, and REM: 0.020% or less.

14. The method for producing a weld joint according to claim 12, wherein the composition of the high-Mn content steel material further comprises, by mass %, at least one of following;
Ni: 10.00% or less, Mo: 3.50% or less,
V: 2.00% or less, Ti: 1.00% or less, and Nb: 1.00% or less,
Cu: 1.00% or less, Al: 0.100% or less, Ca: 0.010% or less, and REM: 0.020% or less.

* * * * *